US006832641B1

(12) United States Patent
Sanz et al.

(10) Patent No.: US 6,832,641 B1
(45) Date of Patent: Dec. 21, 2004

(54) ELECTRIC DUAL SHADE AIRCRAFT WINDOW

(76) Inventors: Eduardo Sanz, 14810 Adios, San Antonio, TX (US) 78248; Gilbert Moreno, 511 S. San Manuel, San Antonio, TX (US) 78237; Joe Martin, 3826 Kirby Dr., San Antonio, TX (US) 78219-1417

( * ) Notice: Subject to any disclaimer, the term of this patent is extended or adjusted under 35 U.S.C. 154(b) by 0 days.

(21) Appl. No.: 10/263,175

(22) Filed: Oct. 2, 2002

Related U.S. Application Data (63) Continuation-in-part of application No. 09/717,181, filed on Nov. 17, 2000, now abandoned, which is a continuation-in-part of application No. 09/500,298, filed on Feb. 8, 2000, now Pat. No. 6,481,486.
(60) Provisional application No. 60/166,109, filed on Nov. 17, 1999.

(51) Int. Cl.[7] .................................................. E06B 3/48
(52) U.S. Cl. ....................... 160/90; 160/107; 160/84.02
(58) Field of Search ............................ 160/84.02, 84.06, 160/107, 113, 115, 117, 90, 168.1 P (56) References Cited

U.S. PATENT DOCUMENTS

| 4,953,610 | A | * | 9/1990 | Phillips et al. | 160/84.03 |
| 5,083,598 | A | * | 1/1992 | Schon | 160/84.02 |
| 6,186,211 | B1 | * | 2/2001 | Knowles | 160/84.02 |
| 6,230,784 | B1 | * | 5/2001 | Sanz et al. | 160/84.02 |
| 6,338,377 | B1 | * | 1/2002 | Domel | 160/84.02 |
| 6,481,486 | B1 | * | 11/2002 | Sanz et al. | 160/84.06 |

* cited by examiner

*Primary Examiner*—Blair M. Johnson
(74) *Attorney, Agent, or Firm*—Jackson Walker LLP (57) ABSTRACT

An aircraft window having a generally rectangular frame with an inner lens. A first shade is movable with respect to the frame and capable of covering a portion of the inner lens. A second shade is also movable with respect to the frame and also capable of covering a portion of the inner lens. An intermediate lens or separation member lies between the first and second shades. Movement of the shades allows for independent and variable control over the light transmitted through the window.

9 Claims, 12 Drawing Sheets

ELECTRIC DUAL SHADE AIRCRAFT WINDOW

This application is a continuation in part of and claims priority from Ser. No. 09/717,181 which was filed Nov. 17, 2000, now abandoned, which was a continuation in part of and claims priority from Ser. No. 09/500,298 filed Feb. 8, 2000 U.S. Pat. No. 6,481,486, which claims the benefit of Ser. No. 60/166,109 filed Nov. 17, 1999.

FIELD OF THE INVENTION

Electric windows for aircrafts, more specifically, an electric window for an aircraft which window features a dual shade, that is either, an inner shade and an outer shade or an upper shade and lower shade, so as to allow the user to selectively control the amount of light passing through the window.

BACKGROUND OF THE INVENTION

Modular windows for aircraft typically include a shade material which has uniform light transmissive capabilities. For example, a modular aircraft window may have a window shade made of a material that is almost opaque. Therefore, when the window shade is down, little light will enter the cabin of the aircraft from the outside. Sometimes this is desired, as, for example, when the passengers wish to view an in-flight movie or sleep. On the other hand, if the passengers desire some but not fill light, they can take such an opaque window shade and move it to a position between fully opened (letting all the light come through the window) and fully closed (blocking light). Such a situation is sometimes satisfactory. However, harsh shadows can be created in such a partially opened condition.

Thus, an important feature of aircraft interior design is the control of the amount of light coming into the cabin of the aircraft. In a first embodiment, Applicants provide, in a unique electric aircraft window having dual shades, the ability to control the amount of light coming through the shade by selecting either a single (translucent or primary) shade to cover the window, or a secondary (opaque) shade to work in combination with the primary shade to block out most of the light. In a second embodiment Applicants provide an upper (or first movable) (opaque or almost opaque) and a lower (or second movable) (translucent) shade, the two shades joined by a common, moveable shade rail.

OBJECT OF THE INVENTION

It is the object of the present invention to provide a system of dual shades for controlling the amount of light coming through an aircraft window into the interior cabin of an aircraft.

A first embodiment of Applicants dual shade window embodiment is provided for in an electric dual shade aircraft window having two motors and two drive systems, one motor for driving a primary shade and a second motor for driving a secondary shade, the secondary shade laterally spaced apart from the primary shade, both shades being driven between an open and closed position, but having a controller for selectively allowing the lowering of the primary shade independent of the secondary shade to selectively control the amount of light passing into the interior of an aircraft cabin.

A second embodiment of Applicants' dual shade window embodiments of the present invention realizes utility in providing an aircraft window that uses two shades, an upper shade, located between a stationary top rail and a movable center rail and a second lower shade located between the center rail and a moveable bottom rail. With each of the two moveable rails independently operated by the aircraft's occupant, such operator may readily provide for the aircrafts lighting needs. This is especially so when one of the two shade fabrics is more light transmissive than the other. For the sake of illustration, one shade fabric may be almost sheer and the other shade fabric almost opaque, providing the occupant with a choice of either fabric or, a combination of the two fabrics.

Further utility lies in providing the window in modular form. Modular form means that the elements of the window (frame, shade, shade control mechanism, etc.). Are constructed into a single unit, which is then installed into an aircraft either when the aircraft is built or subsequently, when the aircraft is modified.

Still further utility lies in providing the modular window with at least an inner pane or lens. This will allow the installed window to isolate the shade between a pair of lenses. This helps keep the shade clean, helps insulate the aircraft interior from heat and noise and is found by some to have aesthetically pleasing qualities.

All of these advantages must be realized while providing for a window that, when viewed from the side, must be narrow (aircraft cabin space is expensive) and curved to match the curves of the aircraft interior and fuselage. Providing the curve to the frame lens and shade raises problems typically not encounted in designing windows for buildings such as homes.

BRIEF DESCRIPTION OF THE DRAWINGS

FIG. 2A is a perspective side view of Applicants' dual shade window.

DETAILED DESCRIPTION OF THE PREFERRED EMBODIMENT

In FIGS. 1a, 1b, 2, 2A, and 3 it is seen that an aircraft window 10 of Applicants' present invention, shown here with the reveal 17A and back lens 15A removed therefrom, may be comprised of a frame 12, typically made up of four rigid elongated members, two vertical and two horizontal, connected in ways known in the trade to form a generally rectangular perimeter structure, the windows being modular for insertion and attachment into the interior of an aircraft. More specifically, frame 12 includes a lower frame member 12a, two side frame members 12b and 12c, and an upper frame member 12d. Typically, the frame is attached to a mask 17, made of an appropriate material. Much of this structure is disclosed in U.S. Pat. No. 4,679,610, the specifications and drawings of which are incorporated herein by reference and attached hereto and intended to be part of this application.

It is seen with respect to FIGS. 1a, 1b, 2, 2A and 3 that window 10 features two shades, an outer shade 14, and an inner shade 16 the inner shade may be more opaque than the outer shade (or vice versa). The shades may be made from a pleated shade material such as that available from Hunter-Douglas under the trademark DUETTE®. Moreover, it is seen that the two shades are staggered (laterally spaced apart) (see FIG. 2) so they may overlap when the window is viewed in side elevation. Each shade has its own shade rail and operates independently from the other as is set forth in more detail below.

The inner shade includes an inner shade rail 20 and the outer shade includes a outer shade rail 18. The two shade rails are attached to the removed end of each of the respective shades, with the near end of each of the respective shades rigidly attached directly, or through a bracket, to top frame member 12d. Therefore, movement of the shade rails will cause the pleats to unfold as shades move between an upper (open) to a lower (closed) position. When the shade rails move up as illustrated in the figures attached, the pleats compress, when the shade rails move down, the pleats expand.

The shades maybe provided with shade leveling cords or alignment means to keep the shade rails horizontal as the shades move between an open and closed position. The details of the alignment means are as set forth in the '610 patent, and also illustrated in the figures attached hereto. Basically, there is an inner shade alignment means 24 and an outer shade alignment means 22, each typically independent of the other, and each comprising a pair of cords attached near the outboard ends of the lower frame member, trending upward to the bottom of the respective shade rails where they encounter a fixed pulley, or other means, to change direction 90° to trend across the bottom of the shade rail until they reach opposite ends of the shade rail whereupon they are directed upward through a hole in the shade rail to tie in, under tension, near the outboard ends of top frame member 12d. This arrangement provides satisfactory alignment or leveling means to keep the two shade rails horizontal as they move between an open and closed position.

Each shade rail is driven by its own drive system, the drive system featuring an inner shade rail motor 26 and an outer shade rail motor 34. Each of the motors feature a drive shaft with a drive sprocket 28 on the removed end thereof. Each of the motors is mounted by appropriate mounting means or brackets near the outboard ends of the top frame member 12d. Each of the drive sprockets drive an endless tooth belt 32, which is wound around drive sprocket 28, and trends from the top rail to the bottom rail where it engages return sprocket 30, which is free to move under the impetus of forces transmitted to the belt by the drive sprocket. Each of the belts 32 (one driven by the outer shade rail motor, the other by the inner shade rail motor) is attached to its respective shade rail through clamp 36.

Figure 4:
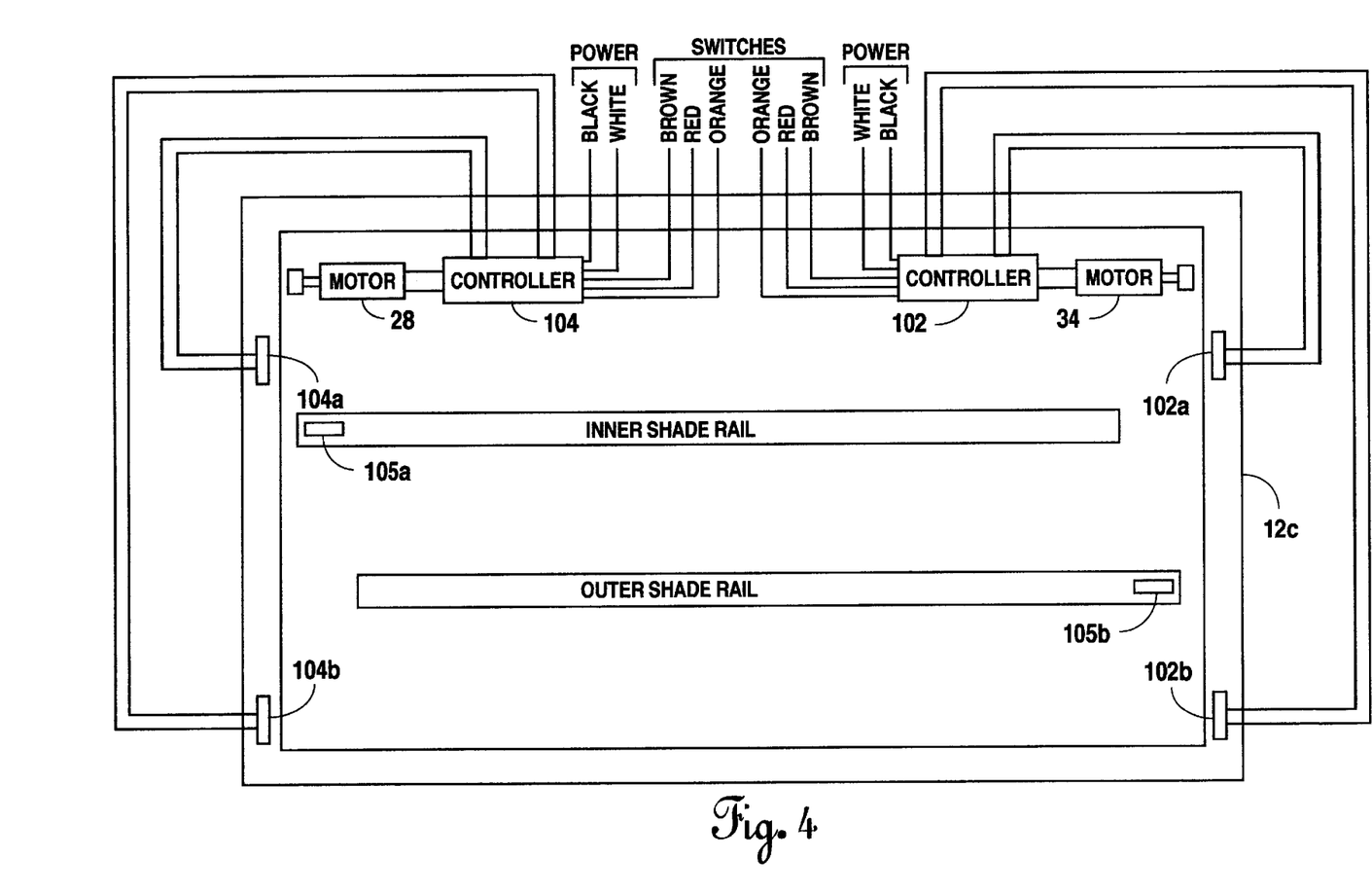
FIG. 4 is an electrical equipment drawing for the first embodiment, featuring a controller energized by the aircraft electrical system for operating the electric motors of Applicants' window through a series of proximity switches activated by the position of the shade rails in a manner set forth more particularly below.

FIG. 4 illustrates a means for controlling movements of the shades through a pair of independently operated controllers, each driving a motor. The controllers in FIG. 4 are designated 102 and 104, and are energized by engagement with the aircraft's electrical system (Black and White). Controller 102 drives the outer shade rail motor 34 and operates the outer shade and controller 104 operates the inner shade rail motor 28 and the inner shade. Controller 102 engages two switches; 102a and 102b. Controller 104 has two switches 104a and 104b. All the switches are normally closed.

The outer shade rail has one magnet 105b on the removed end thereof, and the inner shade rail has one magnet 105a. The magnet 105a will trip the proximity switches 104a and b, which, through the controller, will engage or disengage the motor 28. Magnet 105b will trip switches 102a and b to engage or disengage motor 34. The inner shade rail may be attached to a opaque shade [which allows some light through] and the outer shade may be attached to a typically translucent shade [which will shut off more of the light]. In this fashion, with both shades up, almost 100% of the light is coming into the interior of the aircraft. The translucent shade, either in a partly or fully closed position, allows some light into the interior of the aircraft through the shade. However, when the more opaque shade is lowered in response to movement of the inner shade rail, most of the light is blocked out. In this manner, the passenger can selectively control the amount of light coming into the cabin. Cabin or window mounted switches independently control the two motors.

Figure 1A:
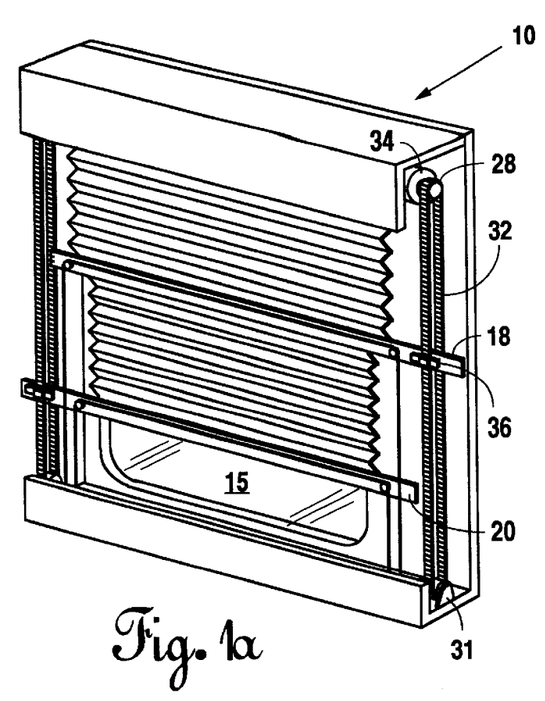
FIGS. 1a, 1b and 2a are side perspective views of an aircraft window of a first embodiment of Applicants' invention with the inner lens and inner reveal removed therefrom.
Figure 1B:
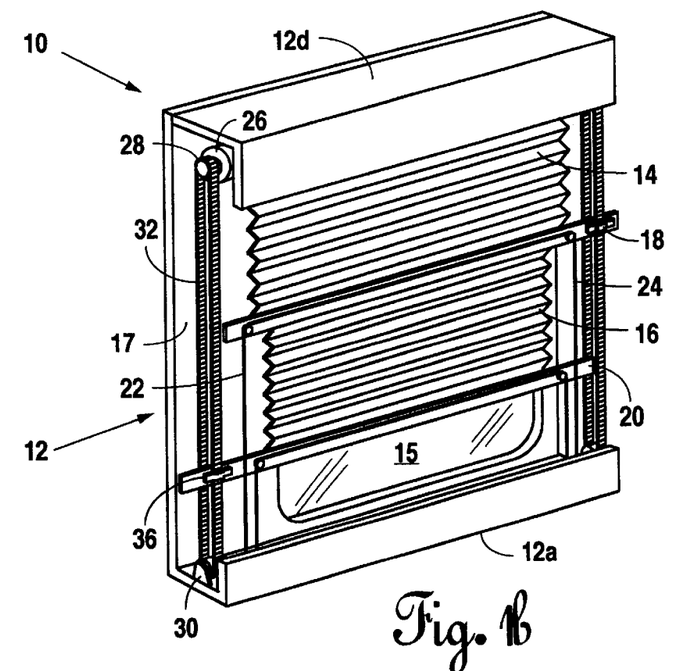
Figure 2:
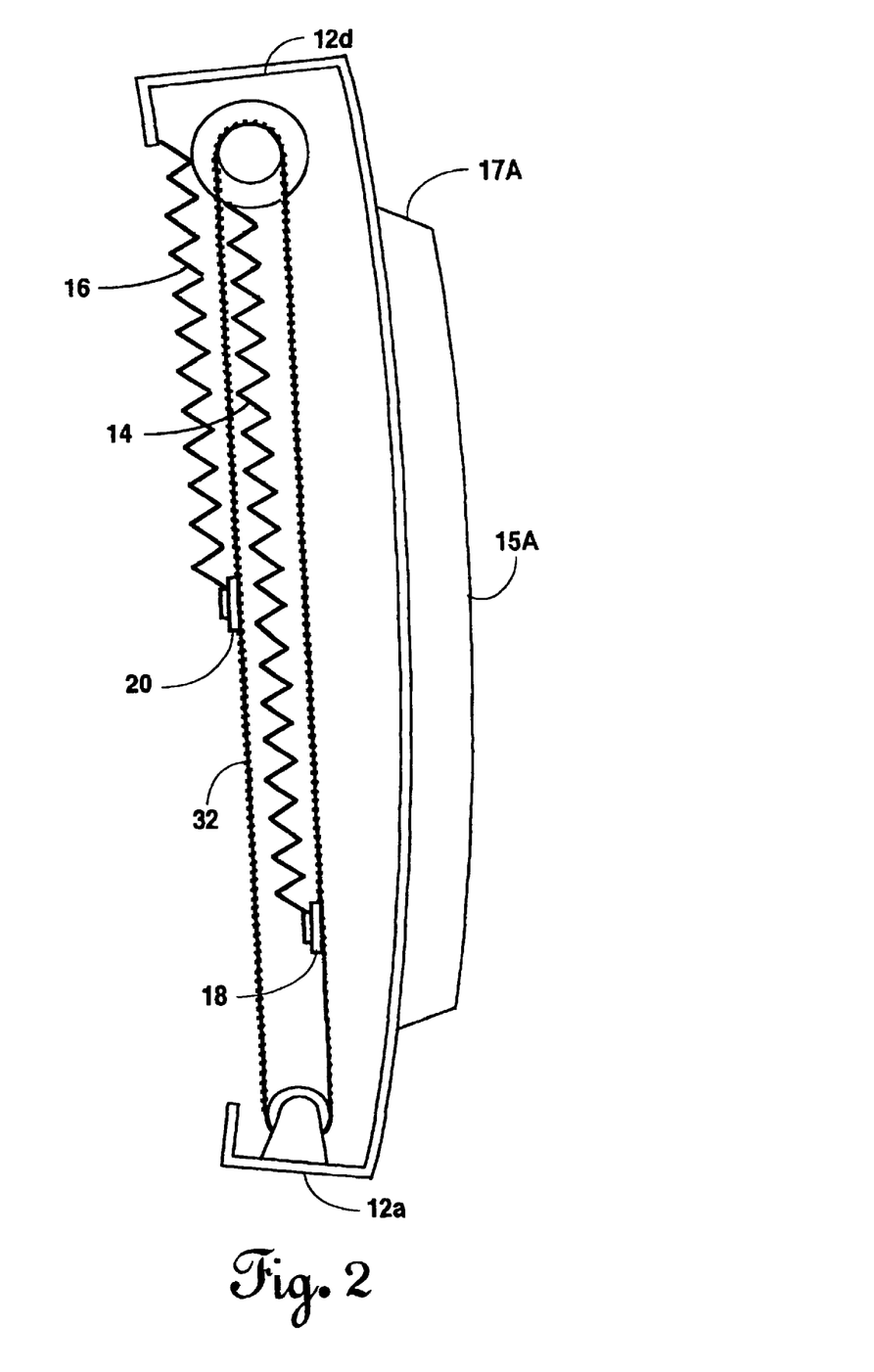
FIG. 2 is a side elevational view from one side of the unique aircraft window of the first embodiment of Applicants' present invention illustrating the manner in which the primary and secondary shades are laterally spaced respective to each other (creating an inner and an outer shade).
Figure 2A:
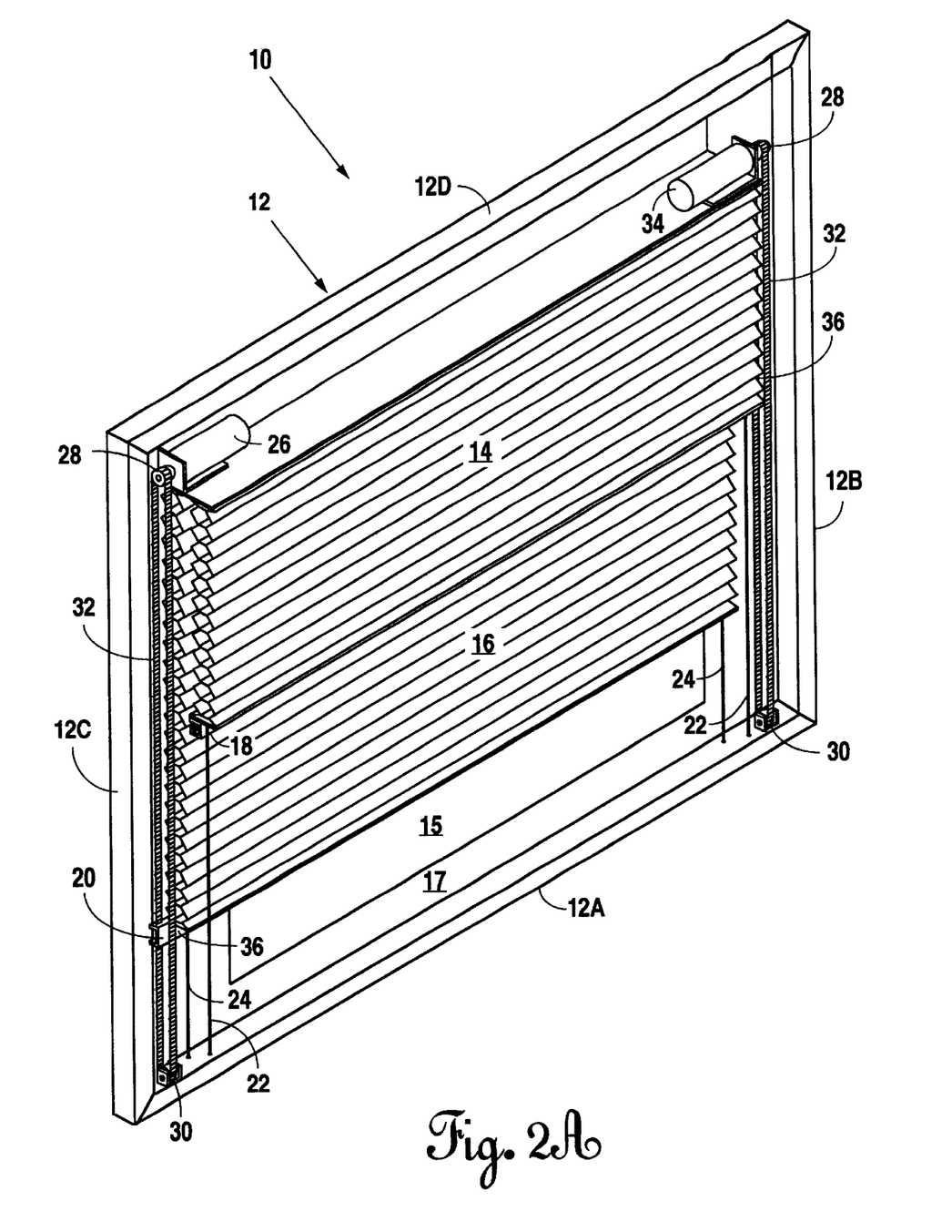
Figure 3:
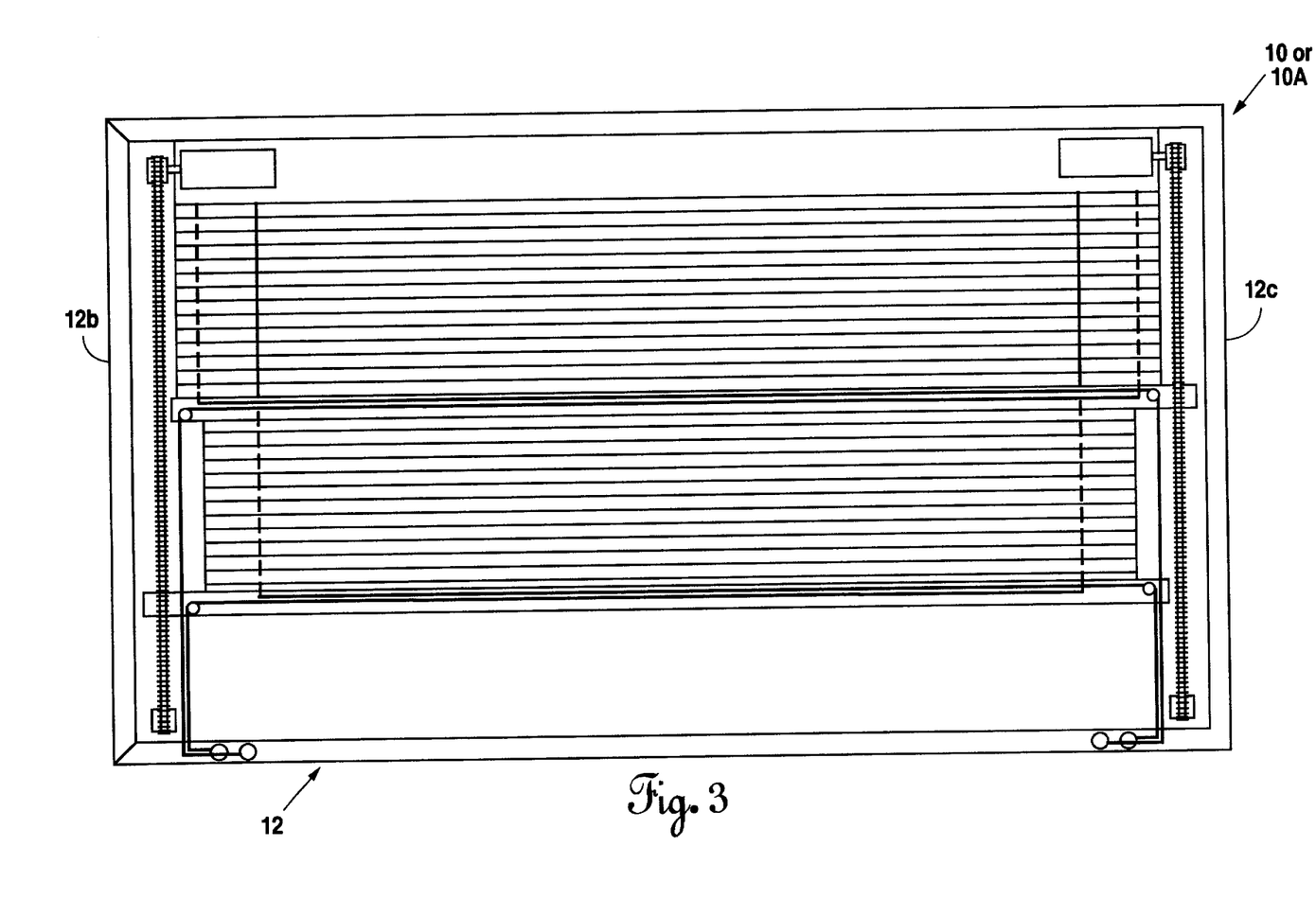
FIG. 3 is a front elevational view of the aircraft window of Applicants' present invention featuring a primary shade as the outer shade and a secondary shade, as the inner shade, for selectively controlling the amount of light entering through an aircraft window into the interior thereof or stacked center movable and lower movable shade rails.
Figure 3A:
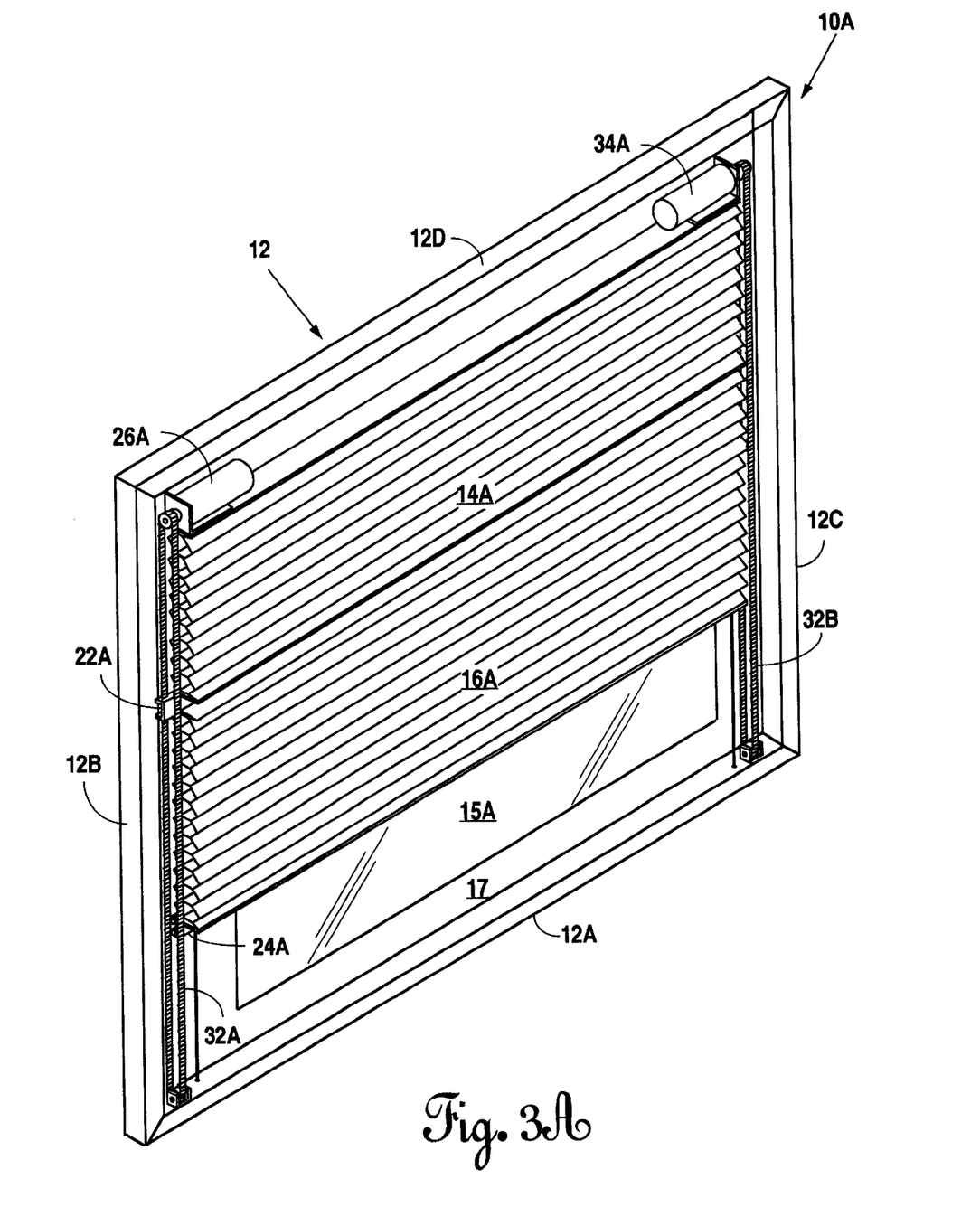
FIG. 3A is a perspective side view of the "stacked" embodiment of Applicants' present invention.
Figure 5:
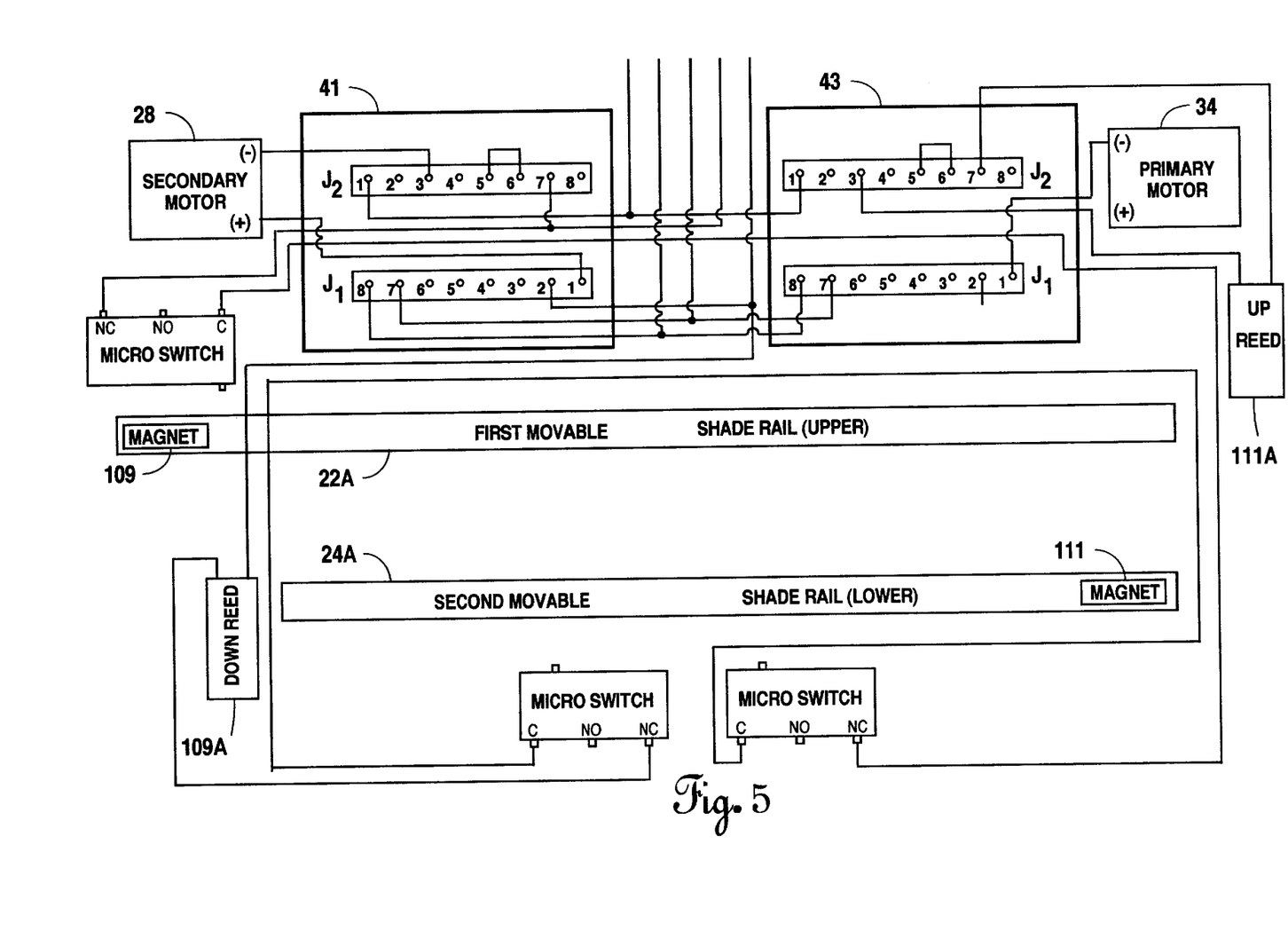
FIG. 5 is an electrical wiring drawing for Applicants' dual shade aircraft window system.
Figure 6:
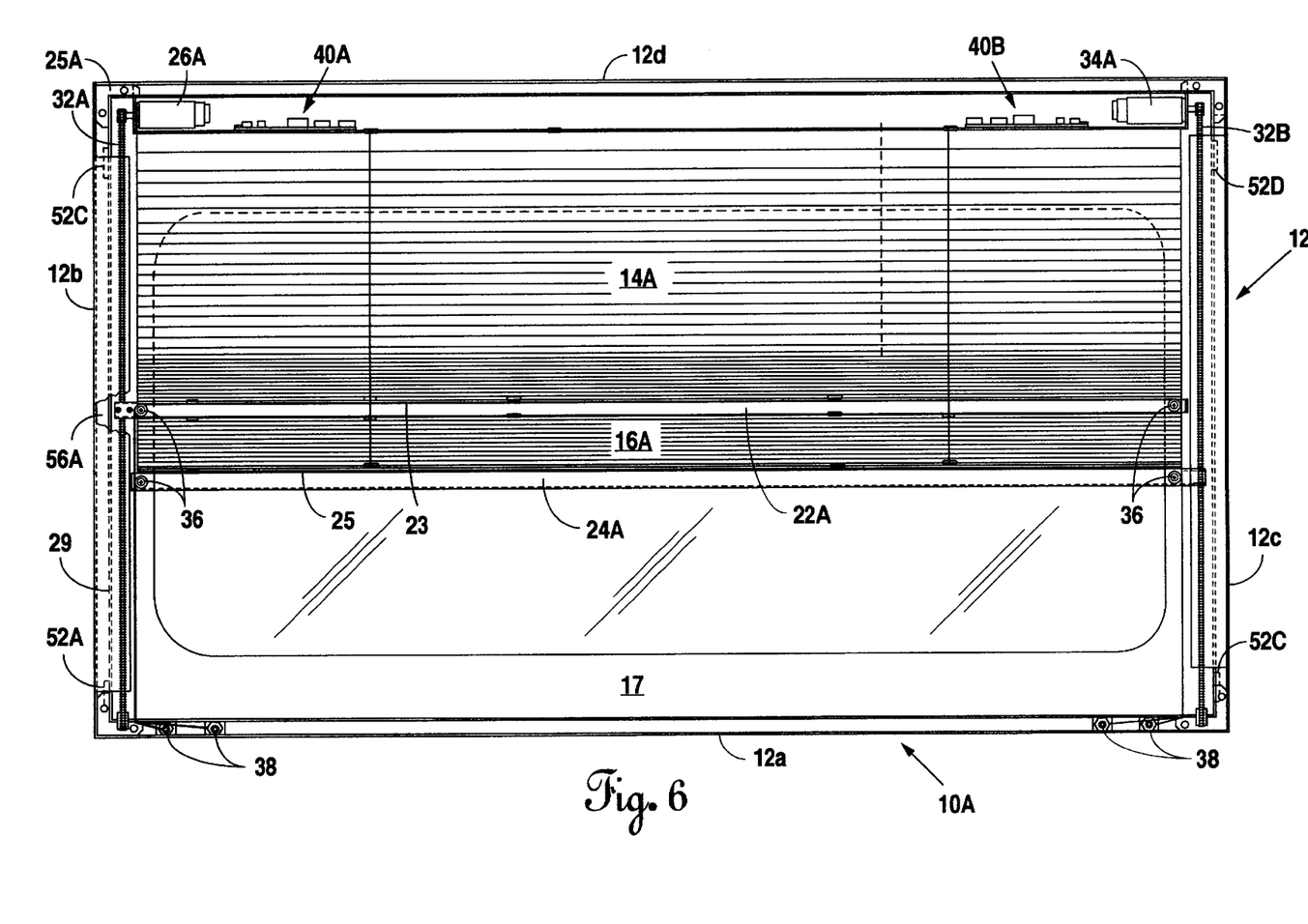
FIG. 6 is a rear elevational view of the second embodiment of Applicants' dual shade aircraft window system.
Figure 6A:
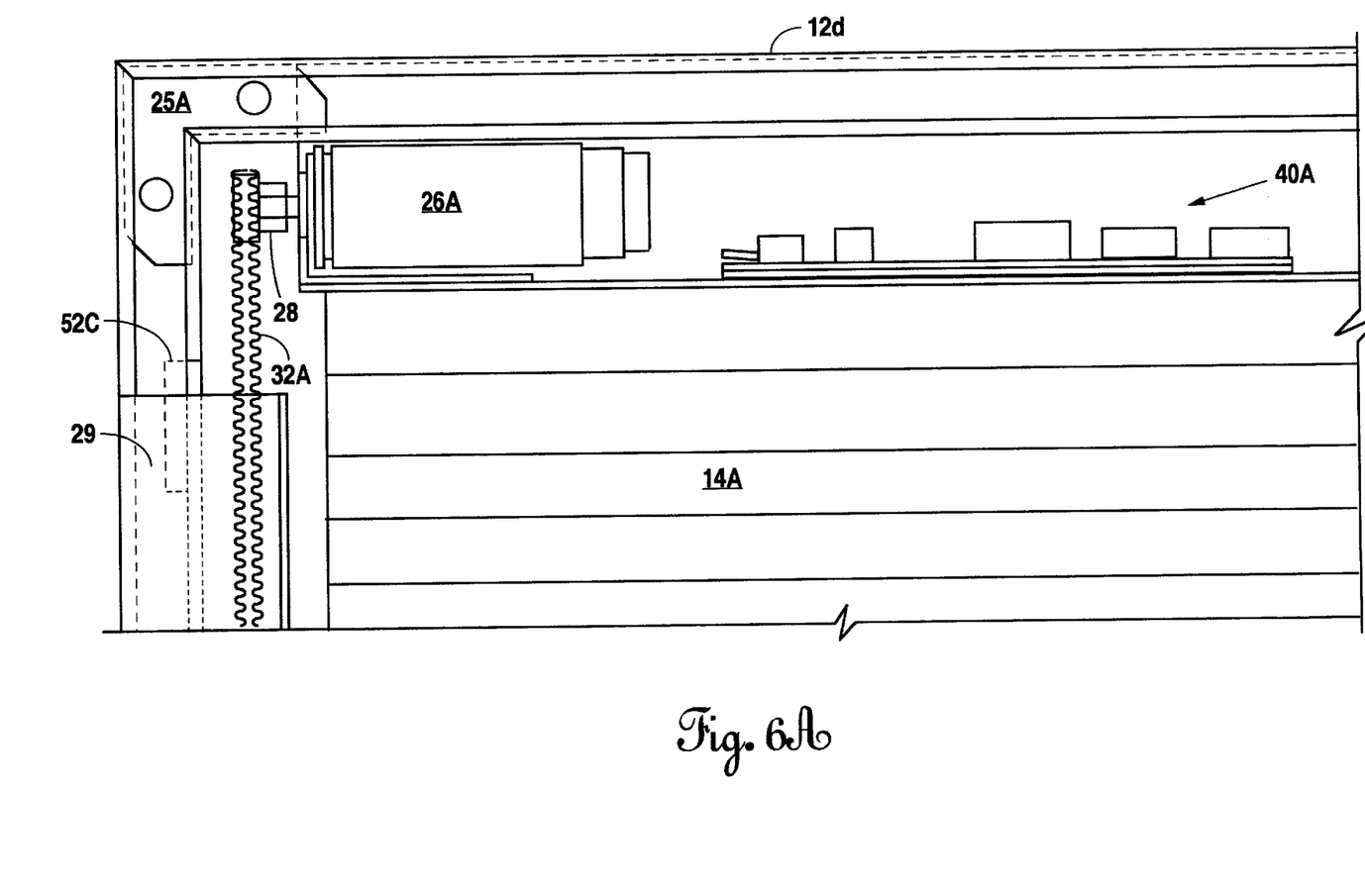
FIG. 6A is an elevational view, cutaway and detail of the upper left hand corner as the window is illustrated in FIG. 6.
Figure 6B:
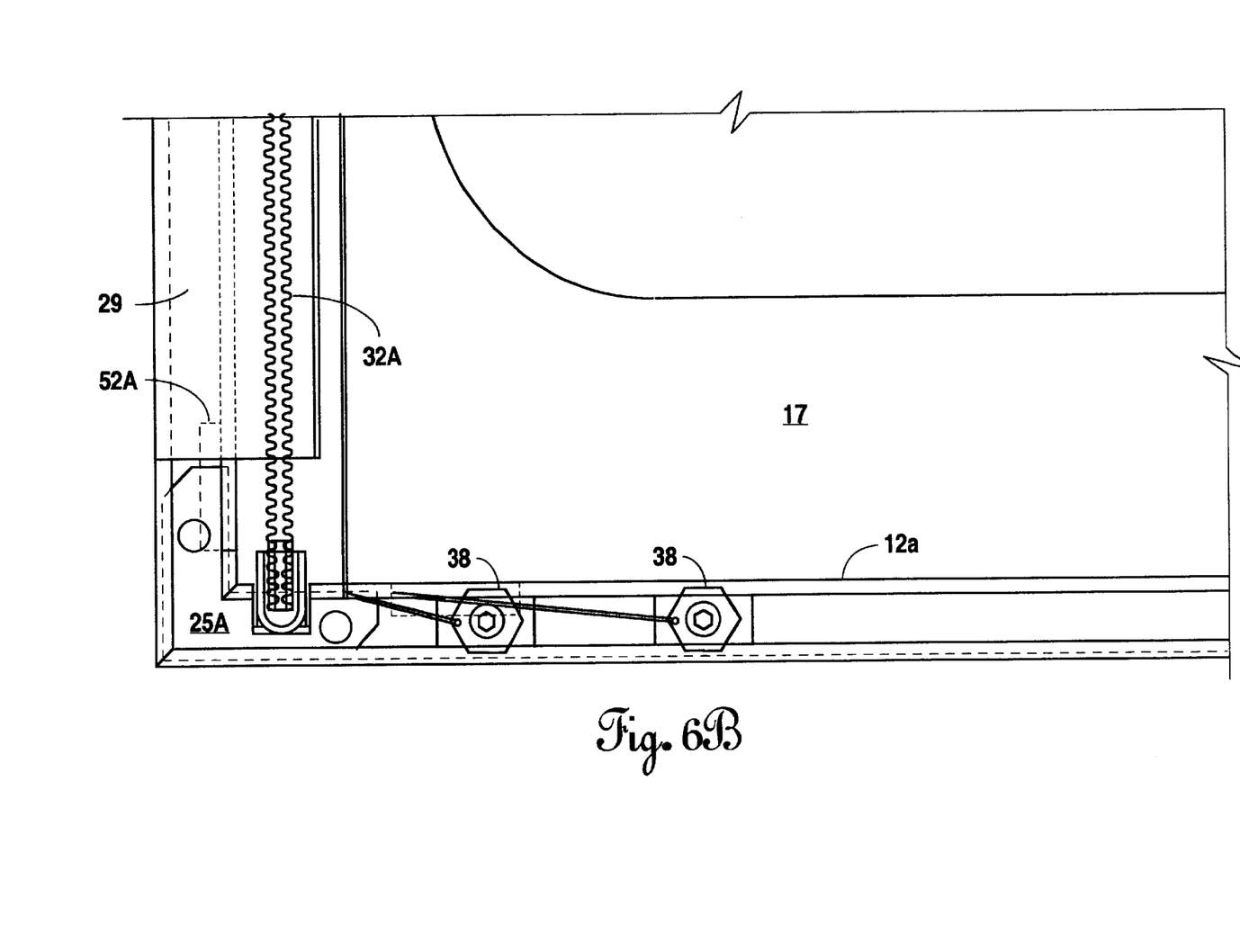
FIG. 6b is an elevational view, cutaway and detail of the lower left hand corner as the window is illustrated in FIG. 6.
Figure 7:
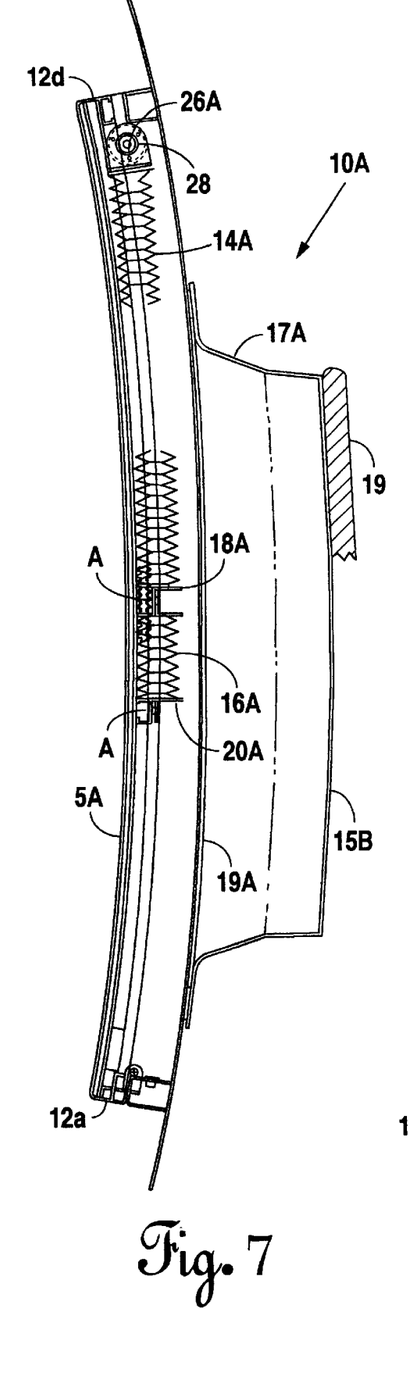
FIG. 7 is a side elevational view of the second embodiment of Applicants' dual shade aircraft window system.

In the schematic and equipment drawing set forth in FIG. 5, an alternate control system to that in FIG. 4 is illustrated, two controllers 41 and 43 from TTT of San Antonio, Tex. are used. This control system is used when the shades are stacked that is, there is an upper and lower shade operating in the same plane, not staggered as in FIGS. 1a and 1b (See FIG. 3A). There are pin connectors J1 and J2 on each of two controllers. In this arrangement, the upper (or first movable) rail will not go down until the lower (or second movable) rail reaches the bottom of its travel and contacts two micro switches 1 and 2. Micro switches 1 and 2, when engaged, will allow the upper shade rail to come down. The black-out, brown-out, white-out, red-out, and orange-out leads go to a local switch next to the window for a passenger to depress and also to a remote located (usually cabin-mounted) override that will energize or de-energize all the windows, rather than just the one window energized by the local switch. Reed switches are an appropriate substitute for micro switches.

Magnets 109 and 111 are on the outboard ends of shade rails 22a and 24a respectively. Down reed switch 109A is tripped by magnet 109 to de-energize motor 28. Up reed switch 111a is tripped by magnet 111 to de-energize motor 34. When first movable rail 22a reaches the top of the window it conducts micro switch 3 to de-energize motor 28.

Wiring harnesses are manufactured by ways known in the trade (see FIG. 5). The controller is available through TTT of San Antonio, Tex. Motors are available through Micro Mo as Model 13312024, and are typically 24 volt DC. Gears, belts, switches and magnets are all available from sources known in the trade.

FIGS. 3, 3A, 6, 6a and 6b and 7 illustrate a second embodiment of Applicants' dual shade window 10a. In this embodiment the window has a typically rectangular frame 12a comprised of four elongated members, including a lower frame member 12a, two side frame members 12b and 12c and an upper frame member 12d. Typically, the frame is attached to an outer reveal 17a, made of fiberglass, composite or other appropriate material. The window shade is made from two members, an upper shade 14a and a lower shade 16a. The upper shade material 14a is typically opaque or almost opaque. One such material that upper shade 14a may be made from a Duette "Eclipse"™. The lower shade material is typically more translucent, blocking some light and reducing the glare, but allowing more light to pass through than the upper shade material. Once such material for use as a lower shade is Hunter-Douglas Duette. The use of an upper and lower shades rather than a dual shade that is staggered such as that set forth in the earlier embodiments (FIGS. 1a and 1b) is that it allows the window to be manufactured thinner. In the embodiment illustrated in FIGS. 3a, 6a, 6b and 7 the upper edge of the upper shade 14a is attached to (directly or indirectly) upper frame member 12d. The lower edge of upper shade 14a is attached to a first movable shade rail 22a. The upper edge of lower shade 16a is attached to first movable rail 22a and the lower edge of shade 16a is attached to second movable rail 24a. The two movable rails 22a and 24a are independently operated by motors 26a and 34a. Each of these motors features a drive shaft with a drive sprocket 28 [on the remove ends thereof]. Each of the drive sprockets drives an endless tooth belt 32a and 32b. Endless tooth belt 32a is attached to a removed end of first movable rail 22a and the other tooth belt 32b is attached to the opposite removed end of second movable shade rail 24a. Thus, when first movable shade rail motor 26a is energized, first movable shade rail 22a will move up or down with the tooth belt along the curve path illustrated in FIG. 7. Likewise, when second movable rail motor 34a is energized second movable rail will move along a curved path as set forth in FIG. 7. Movement of the movable shade rails will allow the expansion and contraction of either or both of shades 14a or 16a.

Controllers 40a and 40b which include switches that are accessible from the cabin of the aircraft to control the two motors are also provided. These will be set forth in more detail below.

First movable rail alignment means 23 and second movable rail alignment means 25 are provided. Each of the alignment means is similarly constructed. Each includes a pair of cords. One end of one cord is tied in to a top rail, descends down through the shade to the movable shade rail (either first or second), and then makes a 90 degree turn at the shade rail and is directed towards the far end of the shade rail. On the far end of the shade rail are shoulder washers 36 mounted to the shade rail (one on either end of the each movable rail) to direct the cord to make a 90 degree angle and trend downward, parallel to the side rails until it reaches the bottom frame rail where it is tied in to the bottom frame rail with adjustable plates 38.

The adjustable plates are typically made up of a plate and a nut and bolt, between which is wedged a portion of the lower frame rail. The adjustable plates allow tension to be provided in each of the four cords. More details of the alignment means are available with reference to this '610 patent, the specifications and drawings of which incorporated wherein by reference. It is noted however, that since there are a pair of movable shade rails then there must be a pair of alignment means (to keep each of the movable shade rails in alignment with the frame when it moves between an upper and lower position). The window may include a an inner lens 15a an intermediate lens 19A and an outer lens 15b or, in the alternative there may be a soft rubber or other applicable bushing 19 along the outer edge of the reveal and the window could be mounted so that the bushing or applicable member 19 is urged from the inside against the factory window aircraft on the fuselage. A plate 29 may be mounted adjacent the inner surface of the two side frame members to extend between the two courses of the toothed belt so that one of the courses may slide or ride easily along the plate. Corner braces 25a may be used to hold the frame members together.

Figure 8:
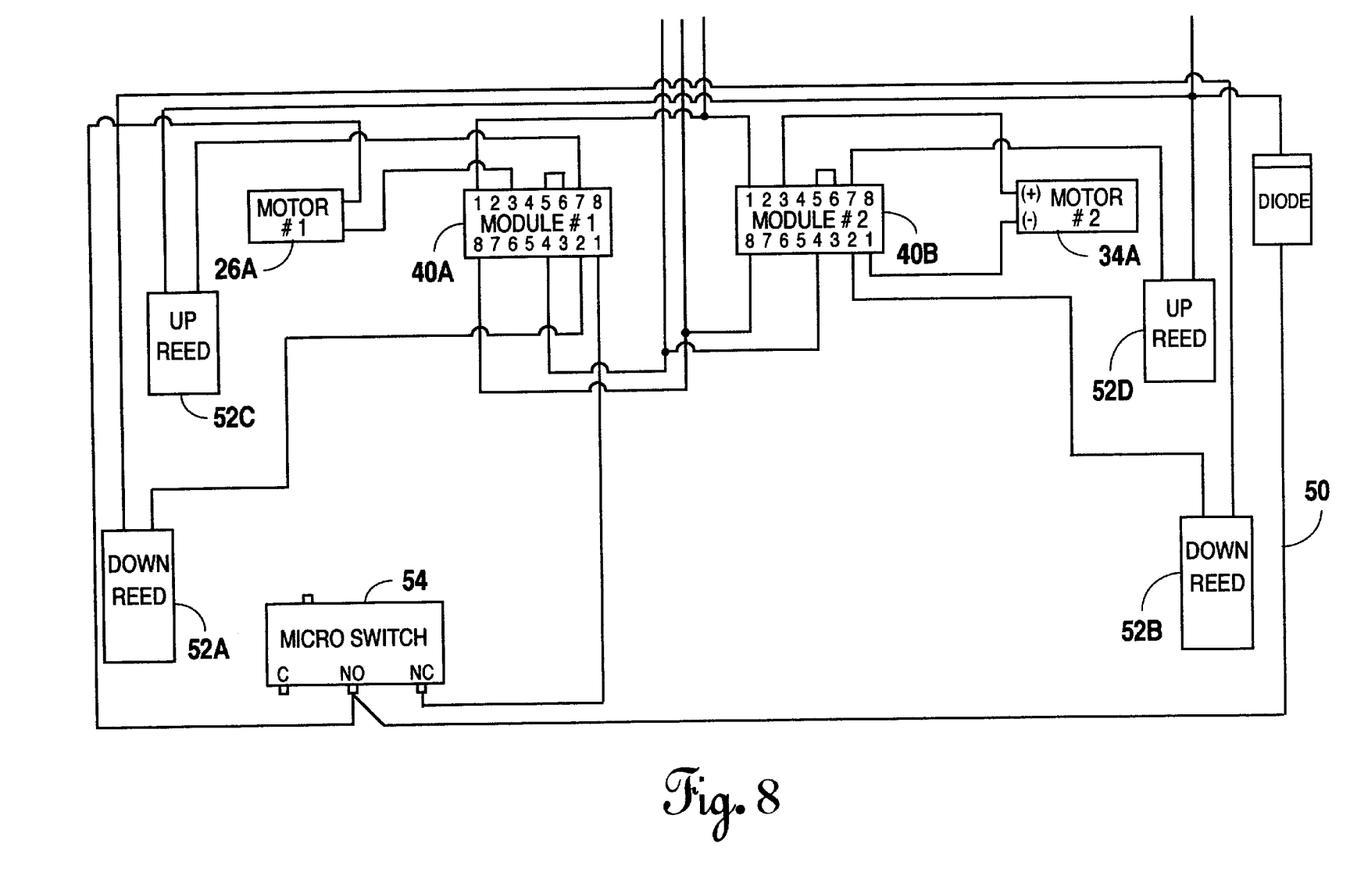
FIG. 8 is an electrical wiring drawn for the second embodiment of Applicants' dual shade aircraft window system.

References now made to Table No. 1 and equipment drawing set forth as FIG. 8. These illustrations and the specifications set forth herein explain means to independently control the up and down motion of the two movable shade rails. The components of the control system are as follows: controllers 40a and 40b; motors 26a and 34a; wires 50 (comprising a wiring harness); internal reed switches 52a, 52b, 52c and 52d; internal micro switch 54 and rail mounted magnets 56a and 56b (one each on opposite outboard-ends of the two movable shade rails). The table set forth below illustrates how the wiring harness is laid out. The black and white wires are power and ground respectively. The red, orange and brown out wires connect to an externally mounted switch which the occupant of the aircraft can engage to move the movable rail up or down. The control modules are available as models 08B from TTT. The motors are available from Micro Mo.

The control system illustrated is operated by the depression of a switch to move the second shade rail up or down between the first shade rail and the frame member. Likewise, the control system can move the first movable rail between a position adjacent the upper frame rail and down to a position a adjacent the second movable shade rail.

| ELECTRIC DUAL SHADE |
| --- |
| *Module 40A and Motor 26A |
| J1 pin 1 green to common on micro-switch 54 at bottom of window from (NO) on mirco-switch green to positive(+) post of motor 26A |
| J1 pin 2 orange to down reed switch 52A, other side of reed orange out of window |
| J1 pin 4 brown out of window |
| J1 pin 8 white out of window |
| J2 pin 1 black out of window |
| J2 pin 3 yellow to negative(−) post of motor 26A |
| J2 pin = s 5 and 6 jumper gray |
| J2 pin 7 red to up reed-switch 52C other side of reed red out of window |
| Module 40B and Motor 34A |
| J1 pin 1 green to negative(−) post of motor 34A |

-continued

ELECTRIC DUAL SHADE

J1 pin 2 orange to down reed switch 52B other side
orange out of window
J1 pin 4 brown out of window
J1 pin 8 white out of window
J2 pin 1 black out of window
J2 pin 3 yellow to positive(+) post of motor 34A
J2 pin = s 5 and 6 jumper gray
J2 pin 7 red to up reed switch 52D other side red
out of window

*All out of window wires can be color matched and spliced so only one wire of different color comes out of window.
*Connect another red wire to red out then to (NO) post of micro-switch 54 at bottom. Red wire to micro-switch 54 also needs in line diode.

Figure 9:
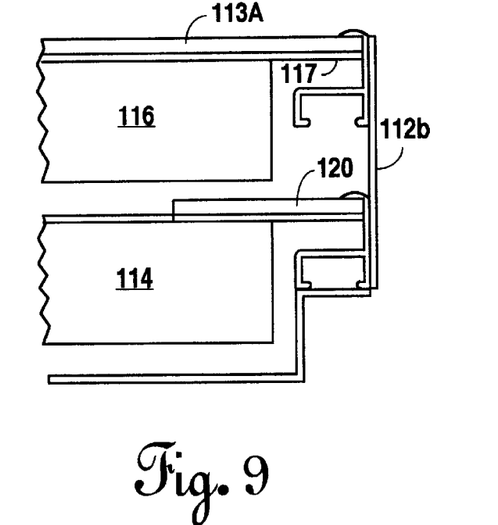
FIG. 9 illustrates a partial cross-section elevational view of an alternate preferred embodiment of Applicants' novel dual shade aircraft window system having a separation member extending between the two shades.
Figure 10:
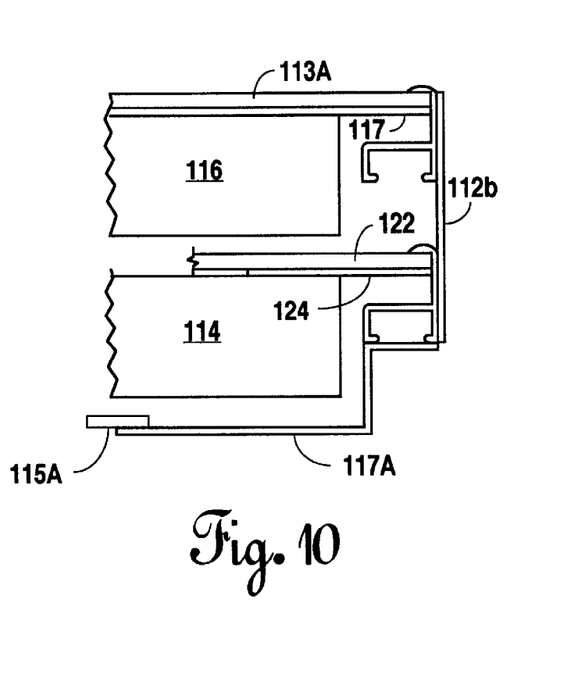
FIG. 10 is a cross-section elevational view of an alternate preferred embodiment of Applicants' novel dual shade aircraft window system having a clear or transparent member between the two shades.

FIGS. 9 and 10 illustrate elevational views of a cutaway section of Applicants' dual window shade system. FIGS. 9 and 10 illustrate additional features of an alternate preferred embodiment of Applicants' present invention illustrating means to maintain lateral separation of the two shades. In FIG. 9, it is seen that a separation member 120 is used. The separation member is a member extending inward, typically from the inner face of both side rails (one side rail, 112b illustrated here) typically from the top frame rail to the bottom. The separation member will extend at least slightly, perhaps up to an inch or two between the inner shade 116 and outer shade 114 so as to hold the two apart laterally. It would not extend so far as to be seen when the shades are up. When the window frame is curved, separation member 120 will allow outer shade 114 to ride against the separation member so as not to fall into the inner shade (this assuming a typical concave window shape when viewed from the inside of the aircraft).

FIG. 10 illustrates the use of an intermediate pane or lens 122 which would extend all the way across from one frame side member to the next and from the top of the window to the bottom so as to, typically, seal the inner shade from the outer shade. Note that this embodiment features a standoff member 124, such as a thin sheet of plastic, which does not extend fully across but lifts the inner edge of the outer shade so it is off intermediate lens 122 so it will not scratch the surface thereof. Sometimes an intermediate lens is desirable for sound suppression, for example. Typically, the features of the earlier embodiments may incorporate either the separation member or the intermediate lens.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

What is claimed is:

1. In an aircraft window for an aircraft, the window comprising:

a generally rectangular frame with an upper frame member and a lower frame member;

an inner lens attached to the frame;

a first shade having a first shade rail, movable up and down with respect to the frame, the first shade capable of covering at least part of the inner lens;

a second shade having a second shade rail, the second shade rail movable up and down with respect to the frame, the second shade capable of covering at least part of the lens;

means to control the movement of the first shade rail;

means to control the movement of the second shade rail; and, an intermediate lens between the first and the second shade.

2. In an aircraft window for an aircraft having an electrical power supply, a window having at least an inner lens and an outer lens, the lenses joined by a generally rectangular frame having a top frame member, a shade comprising:

a first pleated extendable member having a first end fixed to the top frame member thereof, and a second end moveable between an open and a closed position, the open position for allowing sunlight through the lenses of the aircraft window and the closed position for reducing of light therethrough;

a second pleated extendable member having a first end fixed to the top frame member thereof, and a second end moveable between an open and a closed position, the open position for allowing sunlight through the lenses of the aircraft window and in the closed position for reducing the amount of light therethrough;

a first electrical motor including means for engaging the second end of the first pleated extendable member to the first electrical motor such that energizing the first electrical motor causes the second end of the first pleated extendable member to move between an open and a closed position;

a second electrical motor including means for engaging the second end of the second pleated extendable member to the second electrical motor such that energizing the second electrical motor causes the second end of the second pleated extendable member to move between an open and a closed position;

control means for controlling the movement of the first pleated and second pleated extendable members between the open and closed positions; and an intermediate lens between the first and the second shade.

3. The aircraft window of claim 1 further including a first shade rail alignment means; and a second shade rail alignment means.

4. The aircraft window of claim 2 further including a first shade rail alignment means and a second shade rail alignment means.

5. The aircraft window of claim 1 wherein the first and second shade are made from a tubular material.

6. The aircraft window of claim 2 wherein the first and second shade are made from a tubular material.

7. The aircraft window of claim 2 wherein the control means includes means to prevent the extendable members from falling when the motors are not engaged.

8. The aircraft window of claim 2 further including alignment means to independently maintain alignment of the first and second pleated members.

9. The aircraft window of claim 1 wherein the control means includes means to prevent two shades from falling.

* * * * *